US007019177B2

(12) United States Patent
Tortelli et al.

(10) Patent No.: US 7,019,177 B2
(45) Date of Patent: Mar. 28, 2006

(54) PROCESS FOR PREPARING FLUOROHALOGENETHERS

(75) Inventors: Vito Tortelli, Milan (IT); Pierangelo Calini, Milan (IT)

(73) Assignee: Solvay Solexis, S.p.A., Milan (IT)

( * ) Notice: Subject to any disclaimer, the term of this patent is extended or adjusted under 35 U.S.C. 154(b) by 49 days.

(21) Appl. No.: 10/766,215

(22) Filed: Jan. 29, 2004

(65) Prior Publication Data

US 2004/0186324 A1 Sep. 23, 2004

(30) Foreign Application Priority Data

Jan. 30, 2003 (IT) .......................... MI2003A0150

(51) Int. Cl.
*C07C 41/06* (2006.01)

(52) U.S. Cl. ...................... 568/615; 568/607; 568/610; 568/625

(58) Field of Classification Search ................ 568/610, 568/615, 607, 625
See application file for complete search history.

(56) References Cited

U.S. PATENT DOCUMENTS

| 3,132,123 A | 5/1964 | Harris et al. ................ 526/247 |
| 3,226,418 A | 12/1965 | Anderson et al. ........... 558/260 |
| 3,291,843 A | 12/1966 | Fritz et al. .................. 568/674 |
| 3,450,684 A | 6/1969 | Darby ........................ 526/247 |
| 3,721,696 A | 3/1973 | Sianesi et al. .............. 558/283 |
| 3,817,960 A | 6/1974 | Resnick ...................... 568/601 |
| 4,340,750 A | 7/1982 | Yamabe et al. ............. 560/183 |
| 4,515,989 A | 5/1985 | Ezzell et al. ................ 568/674 |
| 4,801,409 A | 1/1989 | Marraccini et al. ......... 260/543 |
| 4,816,599 A | 3/1989 | Gregorio et al. ............ 560/300 |
| 4,827,024 A | 5/1989 | Guglielmo et al. ......... 560/300 |
| 4,900,872 A | 2/1990 | Guglielmo et al. ......... 568/684 |
| 4,906,770 A | 3/1990 | Marchionni et al. ........ 560/300 |
| 4,962,282 A | 10/1990 | Marraccini et al. ......... 562/825 |
| 5,292,961 A | 3/1994 | Marraccini et al. ......... 568/604 |
| 5,350,497 A | 9/1994 | Hung et al. ............ 204/157.92 |
| 5,401,818 A | 3/1995 | Oka et al. ................... 526/247 |
| 6,255,536 B1 | 7/2001 | Worm et al. ................ 568/615 |
| 6,835,856 B1 * | 12/2004 | Tortelli et al. .............. 568/615 |

FOREIGN PATENT DOCUMENTS

| EP | 0 683 181 | 11/1995 |
| EP | 1 148 041 | 10/2001 |
| EP | 1 148 041 A2 | 10/2001 |
| EP | 1 148 072 A2 | 10/2001 |
| EP | 04 00 1633 | 4/2005 |
| JP | WO 02/055471 A1 | 7/2002 |

OTHER PUBLICATIONS

Carl G. Krespan, "Fragmentation of Fluorosulfonyldifluoroacetyl Fluoride Induced by Fluoride Ion," Journal of Fluorine Chemistry, 16 (1980), pp. 385-390.
P. J. Aymonino, "Chemical Communications," No. 12, Jun. 23, 1965, p. 241.
D. Sianesi, A. Pasetti, R. Fontanelli, G.C. Bernardi, G. Caporiccio, "Perfluoropolyethers By Photooxidation of Fluoroolefins," La Chimica E L'Industria, v. 55, n.2 (1973), pp. 208-221.

* cited by examiner

Primary Examiner—Rosalynd Keys
(74) Attorney, Agent, or Firm—Arent Fox PLLC

(57) ABSTRACT

A process for preparing (per)fluorohalogenethers having general formula (II):

$$R'CF_2OCFA\text{-}CA'F_2 \qquad (II)$$

wherein:—
A and A', equal to or different from each other, are H, Cl or Br but they cannot be both H; R' has the following meanings: RO—, wherein R is a (per)fluorinated substituent, selected from the following groups: linear or branched $C_1$–$C_{20}$ alkyl; $C_3$–$C_7$ cycloalkyl; aromatic, $C_6$–$C_{10}$ arylalkyl or alkylaryl; $C_5$–$C_{10}$ heterocyclic or alkylheterocyclic; or a perfluoropolyether substituent T-$R_f$— wherein T=—OCF$_2$OCFA-CA'F$_2$, —OCF$_2$X$_f$, wherein X$_f$=F, CF$_3$, Cl; $R_f$ is a perfluorooxyalkylene chain; by reaction of carbonyl compounds having formula R"COF (III) wherein R"=RO—, or R"=Q-$R_f$— wherein Q=—OCOF, —OCF$_2$X$_f$; in liquid phase with elemental fluorine and with olefinic compounds having formula CAF=CA'F (IV), at temperatures from −120° C. to −20° C.

15 Claims, No Drawings

PROCESS FOR PREPARING FLUOROHALOGENETHERS

The present invention relates to a process for preparing fluorinated vinylethers.

More specifically the present invention relates to the preparation of fluorohalogenethers which by dehalogenation produce the fluorinated vinylethers having one end group —$OCF_2CCF=CF_2$. The invention process leads to obtain fluorohalogenethers having improved yields and selectivity.

As known, fluorinated vinylethers are a class of valuable monomers to obtain various polymers, from fluorinated elastomers to thermoprocessable semicrystalline fluorinated polymers. The vinylethers having the above mentioned end group form a particular class of vinylethers, since they allow one to obtain fluorinated polymers having improved properties. See EP 1,148,041 and EP 1,148,072.

Processes to obtain fluorohalogenethers which use the reaction of hypofluorites with olefins are known in the prior art. For the preparation of hypofluorites the most known processes use catalysts based on metal fluorides.

In U.S. Pat. No. 4,827,024 it is described the preparation in a continuous way of hypofluorites, by the fluorination reaction in equimolecular amounts with fluorine and halogenated carbonyl compounds having at least two carbon atoms, in the presence of catalysts constituted by CsF as such or mixed with metals, such for example copper. Generally said metals are used, besides as catalyst (CsF) supports, also to make the thermal exchange easier, and dissipate the heat generated in the synthesis reaction.

The metal support according to the above described prior art must satisfy two main functions: 1) to maintain the catalyst in a form accessible to reactants; 2) to make the thermal exchange easier maintaining controllable in the required range the catalytic bed temperature. Further and essential support feature is the complete inertia towards reactants and reaction compounds.

In discontinuous hypofluorite synthesis processes, when the catalyst is used in the absence of a support, its successive reuse in the hypofluorite obtainment reaction leads to very low yields and it is noticed a very rapid deactivation.

In U.S. Pat. No. 4,816,599, U.S. Pat. No. 4,801,409 and U.S. Pat. No. 4,962,282 hypofluorites are prefarably prepared in excess of fluorine to completely convert the acylfluoride into hypofluorite, so that the acylfluoride concentration on the catalytic bed be very low, since it is known that some acylfluorides cause decomposition reactions in the presence of catalyst, for example CsF. See for example Carl G. Krespan in Journal of Fluorine Chemistry, 16 (1980) 385–390. Tests caried out by the Applicant on the processes of the prior art for the preparation of hypofluorites starting from acylfluorides using the above described catalysts, have shown that the use of said catalytic systems, both in a discontinuous and continuous way, leads to the rapid reduction of the catalytic activity. The Applicant has found in particular that the activity reduction is very marked, until the complete catalyst deactivation, when in the hypofluorite formation reaction the catalyst is used with an excess of fluorine on the stoichiometric value, reaction conditions indicated as preferred in the processes of the prior art. By operating under said conditions the catalyst deactivates very rapidly, in two-three days. With so short durations it is in practice impossible to have available a continuous industrial plant.

Furthermore, as said, when the catalyst is used in absence of support, its successive reuse in the hypofluorite obtainment reaction leads to very low yields and a very rapid deactivation is observed.

Processes to obtain fluorinated vinylethers are known in the prior art. U.S. Pat. No. 4,900,872 describes the perfluorovinylether precursor preparation, by continuous reaction between perfluoroalkyl hypofluorites diluted in an inert solvent and an olefin having formula $CA'F=CA''F$, wherein A and A', equal to or different from each other, are Cl and Br. In this patent it is indicated that said hypofluorites can be directly fed from the reactor wherein their synthesis in gaseous phase takes place, by reaction of fluorine with acylfluoride on catalyst. The obtained compounds are converted to perfluorovinyl-ethers by dehalogenation with zinc. In said process the drawbacks are those reported above as to the hypofluorite preparation. In particular the drawback of said processes is due to the fact to have to synthesize and immediately use the hypofluorites, which, as known, are unstable compounds, in particular when the number of carbon atoms of the hypofluorite perfluoroalkyl chain is higher than or equal to 2. Besides, in the hypofluorite synthesis it is known that a catalyst must be used, with the above mentioned drawbacks.

Other processes to prepare vinylethers in general are reported in the prior art. U.S. Pat. No. 3,132,123 describes the preparation of perfluoroalkylvinylethers, of the respective homopolymers and copolymers with TFE. The general formula of the described vinylethers is the following: $CF_2=CFOR°_f$, wherein $R°_f$ is a perfluoroalkyl radical preferably from 1 to 5 carbon atoms. A process for preparing said vinylethers is described in U.S. Pat. No. 3,291,843 wherein the starting acylfluoride is salified and pyrolyzed with carbonates optionally in the presence of solvents. The process implies various steps, low yields and undesired hydrogenated by-products are also obtained.

U.S. Pat. No. 3,450,684 describes the preparation of vinylethers of formula:

wherein X=F, Cl, $CF_3$, H and n can range from 1 to 20. The process implies various steps and low yields.

U.S. Pat. No. 3,817,960 relates to the preparation and the polymerization of perfluorovinylethers of formula:

wherein n can range from 1 to 5. The synthesis of the compounds is complicated and requires three steps. The preparation of the starting compound $CF_3O(CF_2O)_nCF_2C(O)F$ is carried out by TFE oxidation at low temperature in the presence of U.V radiations;. the vinylethers are prepared by condensation of the acylfluoride with HFPO (hexafluoropropenoxide) and the subsequent alkaline pyrolysis.

U.S. Pat. No. 4,340,750 describes the preparation of perfluorovinylethers of formula:

wherein $R°_f$ is a $C_1$–$C_{20}$ perfluoroalkyl optionally containing oxygen; $X^A$=H, Cl, Br, F, COOR°, CONR°R' wherein R° is a $C_1$–$C_{10}$ alkyl group and R' represents H or a $C_1$–$C_{10}$ alkyl group. In the preparation of said compounds, an acylfluoride is reacted with iodine and tetrafluoroethylene, then by a deiodofluorination reaction, which takes place with low yields, the vinylether is obtained.

U.S. Pat. No. 4,515,989 describes the preparation of new intermediates for the fluorovinylethers synthesis. According to this pstent the vinylether synthesis is improved by using an intermediate capable to more easily decarboxylate. For the intermediate preparation it is carried out the condensation of an acylfluoride with fluoroepoxides of formula:

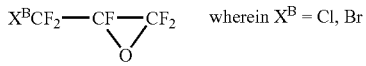   wherein $X^B$ = Cl, Br which are compounds difficult to be prepared, the respective precursors not being easily available.

U.S. Pat. No. 5,350,497 describes the perfluoroalkylvinylethers prearation by fluorination with elemental fluorine of hydrofluorochloroethers and subsequent dechlorination. The synthesis includes various steps, some of them giving low yields.

U.S. Pat. No. 5,401,818 describes the preparation of perfluorovinylethers of formula:

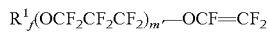

wherein $R^1_f$ is a $C_1$–$C_3$ perfluoroalkyl radical, m' is an integer ranging from 1 to 4, and of its copolymers having improved properties at low temperature. The perfluorovinylether preparation involves various steps, some with very low yields and even comprising a perfluorination with elemental $F_2$.

In the abstract of WO 02/55,471 it is described the preparation of fluorinated vinylethers by exhaustive fluorination with elemental fluorine of partially fluorinated ester precursors, their decomposition to acylfluorides and successive alkaline pyrolysis. This process has the drawback to comprise various steps: in particular the perfluorination requires a high amount of elemental fluorine per mole of partially fluorinated ester, and it must be carried out up to total conversion of all the hydrogen atoms present in the ester, since the partially fluorinated compounds are difficult to be separated from the perfluorinated compound. To reach this goal, a fluorination activator such as benzene, and higher temperatures in the final fluorination phase must be used. Further the HF formed during the reaction must be removed by reaction, for example, with sodium fluoride.

Processes to obtain fluorinated vinylethers having a —$OCF_2OCF$=$CF_2$ end group are known in the prior art. In EP 1,148,041 and in EP 1,148,072 it is described the synthesis of fluorinated vinylethers of general formula

and of the polymers obtainable therefrom, $R_1$ in formula (I) being a (per)fluoroalkyl or (per)fluorooxyalkyl group, $X^1$=F, H. The formation process of formula (I) vinylethers according to said patents foresees various steps. In the first step the continuous synthesis in gaseous phase of the hypofluorite $CF_2(OF)_2$, is carried out by reaction of $CO_2$ and $F_2$ on CsF catalyst. Subsequently the hypofluorite, usually in excess, is added to a first olefin $R_1R_2C$=$CR_3R_4$ at temperatures from −40° C. to −150° C. to obtain the monohypofluorite compound of formula $FCR_1R_2$—$CR_3R_4$—$OCF_2OF$. The monohypofluorite is transferred into a second reactor for the reaction with an olefin of formula $R_5R_6C$=$CR_7R_8$, at temperatures ranging from −20° C. to −130° C., forming the final compound having formula: $FCR_1R_2$—$CR_3R_4$—$OCF_2OCR_5R_6$—$CR_7R_8$—F wherein the meanings of R are those indicated in the mentioned patent. A drawback of said process is the fact that the synthesis of $CF_2(OF)_2$ requires a catalyst must be used. The use of a catalyst, complicates the process on an industrial scale. In fact the costs of the catalyst regeneration, of its substitution and generally of the management of the plant section wherein the catalytic reactor is, are onerous. Furthermore, according to said process, at the end of the first step of the reaction, in the reacted mixture, besides the monohypofluorite, also the unreacted bis-hypofluorite is present. The drawback to operate under these conditions is to have high concentrations of hypofluorites, which are dangerous compounds to be handled since highly reactive and can produce uncontrolled exothermic conditions and explosions.

U.S. Pat. No. 6,255,536 describes the preparation of perfluorovinylethers by a multistage process, wherein hydrogenated or partially fluorinated ester precursors which must be suitably synthesized, are exhaustively fluorinated. The obtained perfluorinated intermediates are converted to the corresponding carboxylic acid salts and successively pyrolyzed into perfluorovinylethers. With this technique also vinylethers containing the —$OCF_2O$— group directly linked to the unsaturation such for example $CF_3OCF_2OCF$=$CF_2$ and $C_2F_5OC$—$F_2OCF$=$CF_2$, are synthesized. The synthesis process described in this patent takes place in more steps, comprising also perfluorination, which can be electrochemically carried out with HF or with elemental fluorine. The drawback of this process is that the electrochemical fluorination has generally low yields and numerous by-products are formed. On the other hand, the fluorination with elemental fluorine, as above indicated in the comments of the prior art, needs a high amount of elemental fluorine for ester mole and must be carried out under such conditions that there be a total conversion of all the hydrogen atoms present in the ester. This means a complication of the industrial process.

The need was therefore felt to have available a process for the preparation of fluorohalogenethers, and therefore of vinylethers, overcoming the drawbacks of the prior art.

The Applicant has surprisingly and unexpectedly found that by using a process described hereinafter it is possible to solve said technical problem, and furthermore to have available a continuous or semicontinuous industrial process having a very high selectivity.

An object of the present invention is a process for preparing (per)fluorohalogenethers having general formula (II):

wherein:
A and A', equal to or different from each other, are H, Cl or Br but they cannot be both H;
R' has the following meanings:
RO—, wherein R is a (per)fluorinated substituent, preferably perfluorinated, selected from the following groups: linear or branched alkyl $C_1$–$C_{20}$, preferably $C_1$–$C_{10}$; $C_3$–$C_7$ cycloalkyl; aromatic, $C_6$–$C_{10}$ arylalkyl or alkylaryl; $C_5$–$C_{10}$ heterocyclic or alkylheterocyclic;
when R is fluorinated it optionally contains one or more H atoms and/or one or more halogen atoms different from F;
when R is alkyl, cycloalkyl, arylalkyl, alkylaryl, alkylheterocyclic, it optionally contains in the chain one or more oxygen atoms;
a perfluoropolyether substituent T-$R_f$—
wherein
T=—$OCF_2OCFA$—$CA'F_2$, —$OCF_2X_f$, wherein $X_f$=F, $CF_3$, Cl;

$R_f$ is a perfluorooxyalkylene chain containing one or more of the following units statistically distributed along the chain:

($C_3F_6O$), selected between ($CF_2CF(CF_3)O$) or ($CF(CF_3)CF_2O$);

($CFX_1O$) wherein $X_1$ is F or $CF_3$;

($C_2F_4O$)

($CF_2(CF_2)_{x'}CF_2O$) wherein x' is an integer equal to 1 or 2;

by reaction of carbonyl compounds having formula (III):

R"COF    (III)

wherein

R"=RO—, wherein R is as above defined; or

R"=Q—$R_f$— wherein:

Q=—OCOF, —OCF$_2$X$_1$ wherein $X_1$ is as above defined;

$R_f$ is as above defined;

in liquid phase with elemental fluorine and with olefinic compounds having formula:

CAF=CA'F    (IV)

wherein A and A' are as above defined, at temperatures from −120° C. to −20° C., preferably from −100° C. to −40° C., optionally in the presence of a solvent inert under the reaction conditions.

The fluorine used in the reaction can optionally be diluted with an inert gas such for example nitrogen or helium.

The process according to the present invention is carried out in a single reactor and the reaction can be carried out in a semicontinuous or continuous way.

The semicontinuous process can for example be carried out by feeding gaseous fluorine into the reactor containing the formula (III) carbonyl compounds and the formula (IV) olefinic compounds. The molar ratio (III)/(IV) can vary in a wide range, for example between 0.05 and 10. The fluorine feeding is continued up to the total olefin conversion. Said condition can be easily determined when the reaction exothermy is no longer noticed. In fact by carrying out the reaction of compounds (IV) and (III) for example at −100° C., as soon as the reaction compounds react with the elemental fluorine, there is exothermy and the temperature increases of about 5° C.–15° C. Therefore the reaction ends when for example compound (IV) has been completely consumed. At this point the reactor temperature comes back to the initial temperature.

In the continuous process the gaseous fluorine and compounds (III), (IV) are fed into the reactor, until reching the steady state. In practice the reactants are fed into the reactor with established flow-rates and the reaction mixture is continuously drawn. The steady state is reached when the concentrations of the three reactants and of the reaction compounds in the reactor is equal to the concentration of the reactants and reaction compounds outflowing out from the reactor.

The molar ratios among the reactants are not particularly binding for the present invention process, for example the molar ratio (III)/(IV) can range from 0.05 to 10 and $F_2$/(IV) from 0.05 to 10.

As solvents in the present invention process, compounds which are liquid and inert in the above mentioned temperature range can be used. Compounds selected for example from (per)fluorocarbons, (per)fluoroethers, (per)fluoropolyethers, perfluoroamines, or respective mixtures, can be used. The skilled man in the art is able to select from the above mentioned classes the compounds to be used as solvents on the basis of their physical properties.

The number average molecular weight of $R_f$ in formula (II) and (III) ranges from 66 to 12,000, preferably from 66 to 1,000, more preferably from 300 to 800.

The perfluorooxyalkylene chains are selected for example from the following:

—($CF_2$—$CF(CF_3)O$)$_m$—($CFX_1O$)$_n$—;    A)

wherein:

$X_1$ is as above defined;

m and n are integers, equal to or higher than zero, and such that the molecular weight of $R_f$ is in the above mentioned molecular weight range;

—($CF_2CF_2O$)$_t$—($CF_2O$)$_p$—;    B)

wherein t and p are integers, equal to or higher than zero, and such that the p/t ratio be in the range 0.2–4, t being different from zero and the molecular weight of $R_f$ is within the above mentioned molecular weight range;

—($CF_2CF_2O$)$_t$—($CFX_1O$)$_n$—($CF(CF_3)CF_2O$)$_m$—;    C)

wherein:

$X_1$ is as above defined;

t, n, m are integers, equal to or higher than zero, and such that the molecular weight of $R_f$ is within the above mentioned molecular weight range.

Preferably when $R_f$ is structure A) the m/n ratio is $\geq 2$ and n is different from zero;

preferably when $R_f$ is structure B), the p/t ratio is from 0.2 to 4, and t is different from zero;

preferably when $R_f$ is structure C), m+t is comprised between 1 and 50; the n/(m+t) ratio is comprised between 0.01 and 0.05, m+t being different from zero.

Preferably the perfluorooxyalkylene chain has structure B) —($CF_2CF_2O$)$_t$—($CF_2O$)$_p$—.

The carbonyl precursor compounds of formula (III) can be prepared according to various methods. According to U.S. Pat. No. 3,721,696 compounds of formula (III) of the type $CF_3O(CF_2O)m"$—COF with $1 \leq m" \leq 100$ are obtained. The compound $CF_3OCOF$ can be prepared by reaction of $CF_3OF$ and CO in the presence of ultraviolet light (P. J. Aymonino, Chem. Comm. 1965, 241) or by dimerization of $COF_2$ (U.S. Pat. No. 3,226,418). Compounds of formula (III) with R'=Q—$R_f$ can be synthesized according to U.S. Pat. No. 4,906,770, by photochemical reaction with oxygen of a raw peroxidic perfluoropolyether, in its turn obtained by photo-oxypolymerization of TFE and/or $C_3F_6$ (Sianesi et Al., Chim. Ind. (Milan), 55, 1973, 208). By operating under the experimental conditions according to U.S. Pat. No. 4,906,770, compounds (III) having a different molecular weight can be obtained. In particular by fractional distillation the single compounds (III) having a molecular weight lower than 400, such for example $CF_3OCOF$, $C_2F_5OCOF$, $CF_3O(CF_2)_2OCOF$, $CF_3OCF_2OCOF$, $CF_3CF_2OCF_2OCOF$, $CF_3O(CF_2CF_2O)_2COF$, can be separated.

Preferably the compounds of formula (III) are $CF_3OCOF$, $C_2F_5OCOF$, $CF_3O(CF_2)_2OCOF$.

The conversion of fluorohalogenethers of formula R'CF$_2$O—CFA—CA'F$_2$ (II) to vinylethers of formula R'CF$_2$OCF=CF$_2$ can be carried out by the known dehalogenation and dehydrohalogenation methods of the prior art.

The following Examples illustrate without limiting it the present invention.

EXAMPLE 1

Synthesis of Fluorohalogen Ethers Using a Mixture of Perfluoropolyether Fluoroformates of Formula Q—$R_f$—COF Wherein Q=—$OCF_3$, —OCOF 50 g of CFC 1112 and 20 g of a mixture containing fluoroformates of formula Q—$R_f$COF wherein $R_f$=—$(CF_2CF_2O)_t$—$(CF_2O)_p$— wherein p/t=0.2; Q=$OCF_3$, OCOF and p and t are such that the average molecular weight of fluoroformates is 476, are introduced in a 50 cc glass reactor. The mixture has the following per cent composition by moles: 50% fluoroformates with Q=—$OCF_3$; 25% fluoroformates with Q=—OCOF, 25% neutral PFPE having formula $CF_3O$—$(CF_2CF_2O)_t$—$(CF_2O)_p$—$CF_3$.

The solution containing fluoroformates has been obtained by fractional distillation of a mixture obtained by photolysis with oxygen, at the temperature of −20° C. (U.S. Pat. No. 4,906,770), of a raw peroxidic perfluoropolyether in its turn obtained by photoxypolymerization of TFE in gaseous phase (Sianesi et Al., Chim Ind. (Milan) 55, 1973, 208) The solution is maintained under stirring at the temperature of −100° C. and 1.5 Nl/h of fluorine diluted with nitogen (molar ratio fluorine-/nitrogen 1/5) are fed therein for 278 minutes. The material balance at the reaction end is 95.0%.

The reaction raw product looks as a transparent oil. The $^{19}F$—NMR analysis shows that the conversion of the end groups —OC(O)F is 44% by moles. The transformation selectivity of fluoroformate end groups to obtain —$OCF_2OCFClCF_2Cl$ end groups is 98%.

The fluorination raw product (81 g) is hydrolyzed in water at 0° C., thus transforming all the end groups —$CF_2OC(O)F$ into carboxylic acids —COOH. The hydrolysis is practically immediate. The so hydrolyzed raw product is let reach 25° C. The organic phase is separated, which is anhydrified over $MgSO_4$ and subsequently filtered through a 0.2μ PTFE membrane. The product is then distilled to remove the by-products deriving from CFC 1112 (CFC 114, CFC 113). A residue weighing 11 g is obtained formed by a mixture containing:

- 6 g of fluorohalogenether of formula T-$R_f$—$CF_2O$—CFCl—$CF_2Cl$, wherein T=—$OCF_3$; —$OCF_2OCFClCF_2Cl$; $R_f$ as above defined and having number average molecular weight $(PM_m)$=650.
- 5 g of neutral PFPE having formula:

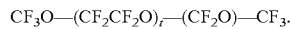

EXAMPLE 2

Dehalogenation of the Fluorohalogenether Synthesized in the Example 1

18.2 g of Zn in powder and 25 ml of dimethylacetamide (DMAM) are transferred into a 2-necked flask, equipped with bubble condenser, dropping funnel and magnetic anchor. The heterogeneous mixture is left under stirring at 85° C. for 30 min. The final mixture obtained in the Example 1 (11 g) is diluted with 15 ml of DMAM. The so obtained solution is added in 30 minutes to the zinc suspension. It is left under stirring for a total time of 1.5 hours after the addition end.

The $^{19}F$ NMR analysis shows that the fluorohalogenether has been completely converted into the corresponding vinylether.

At the reaction end it is cooled to 25° C., washed with CFC 113 and filtered. The fluorinated phase (lower) clearly separates from that of DMAM. By $^{19}F$—NMR analysis one confirms that in the DMAM phase no fluorinated compounds are contained.

The fluorinated phase is washed with an acid aqueous solution to remove the DMAM traces. The fluorinated phase is then anhydrified over $MgSO_4$ and evaporated at 50° C. and 400 mm of residual Hg.

9.7 g of an oil are obtained, containing:

- 4.7 g of vinylether of formula T-$R_f$—$CF_2O$—CF=$CF_2$, wherein
  T=—$OCF_3$; —$OCF_2OCF$=$CF_2$; $R_f$ as above defined and having number average molecular weight=579.
- 5 g of neutral PFPE having formula:

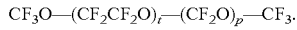

The conversion is quantitative. The yield is 88%.

EXAMPLE 3

Synthesis of the Fluorohalogen Ether $CF_3CF_2OCF_2OCFClCF_2Cl$ from fluoroformate $CF_3CF_2OCOF$ and CFC 1112

20 g of CFC 1112 and 27 g of $CF_3CF_2OCOF$ obtained by fractional distillation of a mixture of PFPE fluoroformates synthesized according to U.S. Pat. No. 4,906,770 by photochemical reaction with oxygen of a peroxidic raw product in its turn obtained by photopolymerization of TFE with oxygen at a temperature of 0° C. are introduced in the same reactor of the Example 1. The solution is maintained at −100° C. and 1.5 l/h of fluorine diluted with nitrogen (molar ratio fluorine/nitrogen 1/5) are introduced therein for 8 hours.

The material balance at the reaction end is 94%.

The $^{19}F$ NMR analysis on the reaction raw product shows that the conversion of $CF_3CF_2OCOF$ is 51%. The selectivity in the compound $CF_3CF_2OCF_2OCFClCF_2Cl$ is 99%. The fluorination raw product (51 g) is treated as in the Example 1 and distilled. A fraction formed by 26 g of $CF_3CF_2OCF_2OCFClCF_2Cl$ pure at 99% separates at 80° C.

EXAMPLE 4

Dehalogenation of $CF_3CF_2OCF_2OCFClCF_2Cl$ 150 ml of dimethylformamide (DMF), 15 g of zinc in powder, 0.5 g of $K_2CO_3$ and 100 mg of iodine are introduced in a 250 ml 3-necked flask, equipped with mechanical stirrer, thermometer, dropping funnel, distillation column equipped with water condenser and collecting trap maintained at −78° C. and connected to a vacuum mechanical pump. The internal temperature is brought to 80° C. and 50 g of $CF_3CF_2OCF_2OCFClCF_2Cl$ are dropwise added. When the addition is over, it is let react for 30 minutes. Finally the internal pressure is gradually brought from the initial 760 mm Hg to 300 mm Hg.

After about 20 minutes the collecting trap, which contains 34.2 g of $CF_3CF_2OCF_2OCF$=$CF_2$, is disconnected. Boiling point: 41.9° C.

The invention claimed is:

1. A process for preparing (per)fluorohalogenethers having general formula (II):

  (II)

wherein:
A and A', equal to or different from each other, are H, Cl or Br but they cannot be both H;

R' has the following meanings:
RO—, wherein R is a fluorinated or (per)fluorinated substituent, selected from the following groups: linear or branched $C_1$–$C_{20}$ alkyl; $C_3$–$C_7$ cycloalkyl; aromatic, $C_6$–$C_{10}$ arylalkyl or alkylaryl; $C_5$–$C_{10}$ heterocyclic or alkylheterocyclic;
when R is fluorinated, it optionally contains one or more atoms of H and/or one or more halogen atoms different from F;
when R is alkyl, cycloalkyl, arylalkyl, alkylaryl, alkylheterocyclic, it optionally contains in the chain one or more oxygen atoms;
a perfluoropolyether substituent T-$R_f$—
wherein
T=—$OCF_2OCFA$-$CA'F_2$, —$OCF_2X_1$, wherein $X_1$=F, $CF_3$, Cl;
$R_f$ is a perfluorooxyalkylene chain containing one or more of the following units statistically distributed along the chain:
($C_3F_6O$), selected between ($CF_2CF(CF_3)O$) or ($CF(CF_3)CF_2O$);
($CFX_1O$) wherein $X_1$ is F or $CF_3$;
($C_2F_4O$);
($CF_2(CF_2)_{x'}CF_2O$) wherein x' is an integer equal to 1 or 2;
by reaction of carbonyl compounds having formula (III):

R"COF  (III)

wherein
R"=RO—, wherein R is as above; or
R"=Q-$R_f$— wherein:
Q=—OCOF, —$OCF_2X_1$ wherein $X_1$ is as above;
$R_f$ is as above;
in liquid phase with elemental fluorine and with olefinic compounds having formula:

CAF=CA'F  (IV)

wherein A and A' are as above,
at temperatures from –120° C. to –20° C., optionally in the presence of a solvent inert under the reaction conditions.

2. A process according to claim 1, wherein the fluorine used in the reaction is diluted with an inert gas.

3. A process according to claim 1, carried out in a semicontinuous or continuous way.

4. A process according to claim 3, wherein in the semicontinuous process the molar ratio between the carbonyl compound (III) and the olefin (IV) ranges from 0.05 to 10.

5. A process according to claim 3, wherein in the continuous process the molar ratio between the carbonyl compound (III) and the olefin (IV) ranges from 0.05 to 10 and the molar ratio $F_2$/olefin (IV) ranges from 0.05 to 10.

6. A process according to claim 1, wherein the number average molecular weight of $R_f$ in formula (II) and (III) ranges from 66 to 12,000.

7. A process according to claim 6, wherein the perfluorooxyalkylene chains are selected from the following:

—$(CF_2$—$CF(CF_3)O)_m$—$(CFX_1O)_n$—;  A)

wherein:
$X_1$ is as above;
m and n are integers, equal to or higher than zero, such that the molecular weight of $R_f$ is in the above molecular weight range;

—$(CF_2CF_2O)_t$—$(CF_2O)_p$—;  B)

wherein t and p are integers, equal to or higher than zero, such that the p/t ratio is in the range 0.2–4, t being different from zero and the molecular weight of $R_f$ is within the above molecular weight range;

—$(CF_2CF_2O)_t$—$(CFX_1O)_n$—$(CF(CF_3)CF_2O)_m$—;  C)

wherein:
$X_1$ is as above;
t, n, and m are integers, equal to or higher than zero, such that the molecular weight of $R_f$ is within the above molecular weight range.

8. A process according to claim 7, wherein when $R_f$ is structure A) the m/n ratio is $\geq 2$ and n is different from zero;
when $R_f$ is structure B), the p/t ratio is from 0.2 to 4, and t is different from zero;
when $R_f$ is structure C), m +t is comprised between 1 and 50; the n/(m +t) ratio is comprised between 0.01 and 0.05, m +t being different from zero.

9. A process according to claim 7, wherein the perfluorooxyalkylene chain has structure B) —$(CF_2CF_2O)_t$—$(CF_2O)_p$—.

10. A process according to claim 1, wherein the carbonyl compounds of formula (III) are $CF_3OCOF$, $C_2F_5OCOF$, or $CF_3O(CF_2)_2OCOF$.

11. A process according to claim 1, wherein the solvents are liquid and inert in the temperature range of the process and are selected from (per)fluorocarbons, (per)fluoroethers, (per)fluoropolyethers, perfluoroamines, or respective mixtures.

12. A process of claim 1, wherein R is a linear or branched $C_1$–$C_{10}$ alkyl.

13. A process of claim 1 at temperatures from –100° C. to –40° C.

14. A process according to claim 6, wherein the number average molecular weight of $R_f$ in formula (II) and (III) ranges from 66 to 1,000.

15. A process according to claim 14, wherein the number average molecular weight of $R_f$ in formula (II) and (III) ranges from 300 to 800.

* * * * *